(12) United States Patent
Kuijpers et al.

(10) Patent No.: US 6,780,452 B2
(45) Date of Patent: Aug. 24, 2004

(54) METHOD AND MEANS FOR CURVING SAUSAGE LINKS

(75) Inventors: Martinus W. J. T. Kuijpers, Oploo (NL); Frederik F. L. H. Ankersmit, Boxmeer (NL)

(73) Assignee: Townsend Engineering Company, Des Moines, IA (US)

( * ) Notice: Subject to any disclaimer, the term of this patent is extended or adjusted under 35 U.S.C. 154(b) by 345 days.

(21) Appl. No.: 10/037,098

(22) Filed: Oct. 22, 2001

(65) Prior Publication Data

US 2003/0077366 A1 Apr. 24, 2003

(51) Int. Cl.$^7$ ............................................... A22C 11/02
(52) U.S. Cl. ........................ 426/513; 426/514; 426/517; 426/518; 426/523; 452/35; 452/37; 452/49
(58) Field of Search .......................... 426/92, 105, 135, 426/140, 513, 514, 517, 518, 520, 646; 452/30, 35, 37, 49

(56) References Cited

U.S. PATENT DOCUMENTS

| | | | | |
|---|---|---|---|---|
| 3,834,849 A | * | 9/1974 | Supran et al. | ............... 425/206 |
| 3,934,050 A | * | 1/1976 | Hawkins | ..................... 426/645 |
| 4,110,871 A | | 9/1978 | Greenham et al. | |
| RE30,390 E | * | 9/1980 | Kupcikevicius et al. | ....... 17/49 |
| 4,501,542 A | | 2/1985 | Nausedas | |
| 4,731,906 A | * | 3/1988 | Matthews et al. | ......... 99/450.7 |
| 4,921,714 A | * | 5/1990 | Matthews et al. | ............ 426/90 |
| 6,042,466 A | | 3/2000 | Matthews et al. | |

FOREIGN PATENT DOCUMENTS

| | | |
|---|---|---|
| EP | 0 720 816 A1 | 7/1996 |
| EP | 1 057 409 A1 | 12/2000 |

* cited by examiner

*Primary Examiner*—Drew Becker

(57) ABSTRACT

A method of creating curved sausage links involves extruding an elongated sausage strand having linear protein fibers therein out of an elongated hollow meat emulsion extrusion tube. The flow of meat emulsion through the tube is partially restricted by a restrictor element within the tube which permits a portion of the meat emulsion to pass thereover in a substantially uninterrupted manner, but which requires a separate layer of meat emulsion to have its movement through the tube inhibited by engaging the restrictor element and having to move thereover to exit the tube. When the sausage strand is subjected to heat, the uninterrupted portion is inclined to have more lengthwise shrinkage in the presence of heat than the other layer, thus causing the sausage link to assume a curved configuration. The machine for practicing this method has a stuffing tube with the restrictor element therein as described heretofore.

9 Claims, 4 Drawing Sheets

METHOD AND MEANS FOR CURVING SAUSAGE LINKS

BACKGROUND OF THE INVENTION

Curved sausage links, as compared to straight sausage links, have great appeal in certain sausage markets throughout the World. Efforts have been made to create a curved configuration in otherwise straight sausages by using mechanical forces or pre-curved casings. Other attempts have been made to create curved sausages by introducing two separate streams of meat-dough into a stuffing tube whereby the separate layers of sausage material will shrink in variable increments to induce a curve in the resulting link. However, introducing two different meat-dough materials into the casing is difficult and expensive. Other disadvantages of earlier inventions (e.g., EP0720816B1) is that the flow of material will be blocked by meat particles when producing sausage strands of smaller diameters.

It is therefore a principal object of this invention to provide a method and means for curving sausage links wherein only a single material can be introduced into the sausage extrusion or stuffing tube.

A further object of this invention is to provide a resistor element in the hollow sausage tube to allow a first portion of the sausage emulsion to flow freely through the tube while another portion of sausage material will be inhibited by the resistor element, thereby allowing the first portion to have linearly disposed protein fibers, which gradually progresses to a second portion comprised of interrupted sausage emulsion which will have sausage fibers disposed in a random orientation, thus causing a different shrinkage phenomenon between the two general portions when heat is supplied thereto.

These and other objects will be apparent to those skilled in the art.

BRIEF SUMMARY OF THE INVENTION

A method of creating curved sausage links involves extruding an elongated sausage strand having linear protein fibers therein out of an elongated hollow meat emulsion extrusion tube. The flow of meat emulsion through the tube is partially restricted by a restrictor element within the tube which permits a portion of the meat emulsion to pass thereover in a substantially uninterrupted manner, but which requires a separate portion of meat emulsion to have its movement through the tube inhibited by engaging the restrictor element and having to move thereover to exit the tube. This phenomenon causes the unrestricted meat emulsion to have the elongated protein fibers therein to position themselves in a linear configuration, with the interrupted meat emulsion portion having the protein fibers therein changed to a random configuration. A gradient of the linear fibers generally called a first portion gradually progresses to the second general portion where the fibers are in a random configuration. When the sausage strand comprising the two general portions which exit the extrusion tube are subjected to heat, the uninterrupted portion is inclined to have more lengthwise shrinkage in the presence of heat than the other portions, thus causing the sausage link to assume a curved configuration. The machine for practicing this method has a stuffing tube with the restrictor element therein as described heretofore.

DETAILED DESCRIPTION OF THE PREFERRED EMBODIMENT

Figure 7:
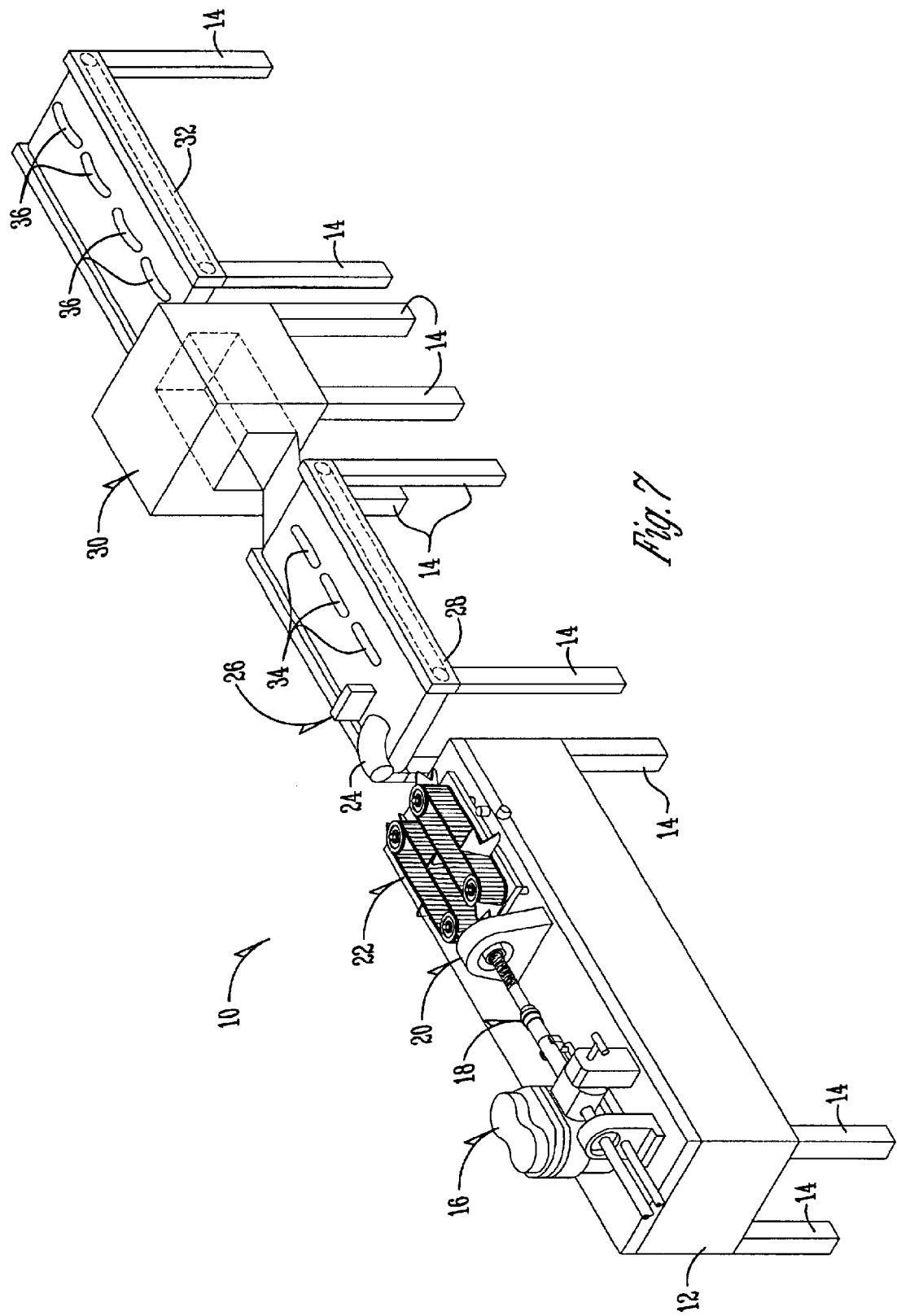
FIG. 7 is a schematic view of a sausage machine embodying the features of this invention.

With reference to FIG. 7, a conventional sausage making machine has a frame 12 and supporting legs 14. A meat emulsion pump 16 is operatively connected to a stuffing or extrusion tube 18 of this invention which is located directly upstream from a conventional twister assembly 20. Immediately downstream therefrom is a conventional linker assembly which divides the sausage strand from the twister to be divided into separate sausage links. Those links are discharged conventionally from the linker assembly through a discharge horn 24. A conventional link cutter 26 divides the sausage strand into a plurality of links which are deposited on the endless conveyor 28. The conveyor 28 deposits the links thereon through a heater 30, which in turn deposits the links to an exit conveyor 32. The heater 30 could be a microwave oven, a vat of hot oil, a frying surface, a steam cooker with saturated hot air, hot liquid smoke, etc. The links 34 on conveyor 28 have a straight configuration, and as will be explained hereafter, the links 34 are changed to a curved configuration as shown by the links 36 shown on conveyor 32. This change in configuration is effected as the links pass through the heater 30.

Figure 1:
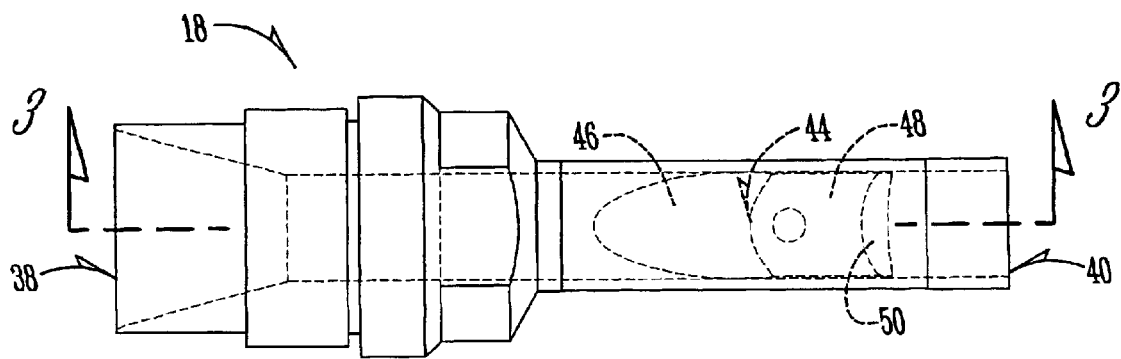
FIG. 1 is a side elevational view of an extrusion or stuffing tube used in this invention.
Figure 2:
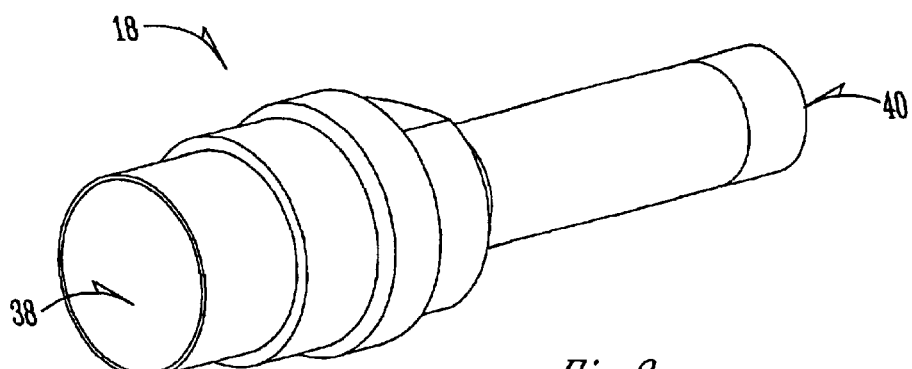
FIG. 2 is a perspective view thereof.
Figure 3:
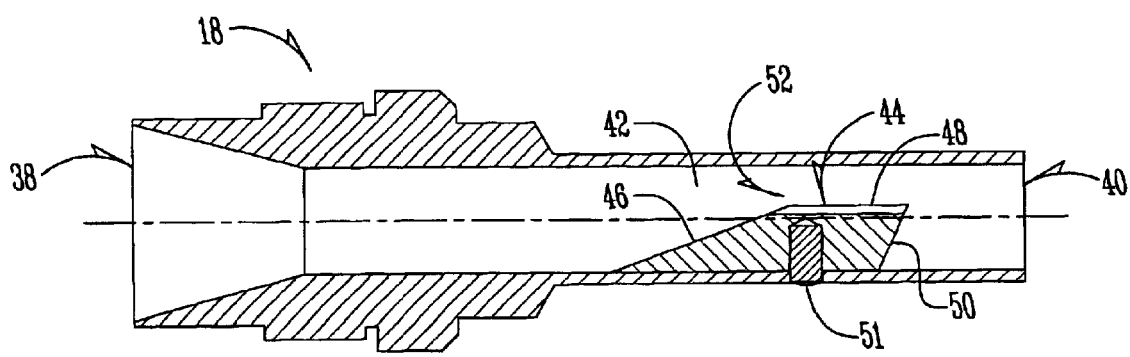
FIG. 3 is an elongated sectional view thereof.
Figure 4:
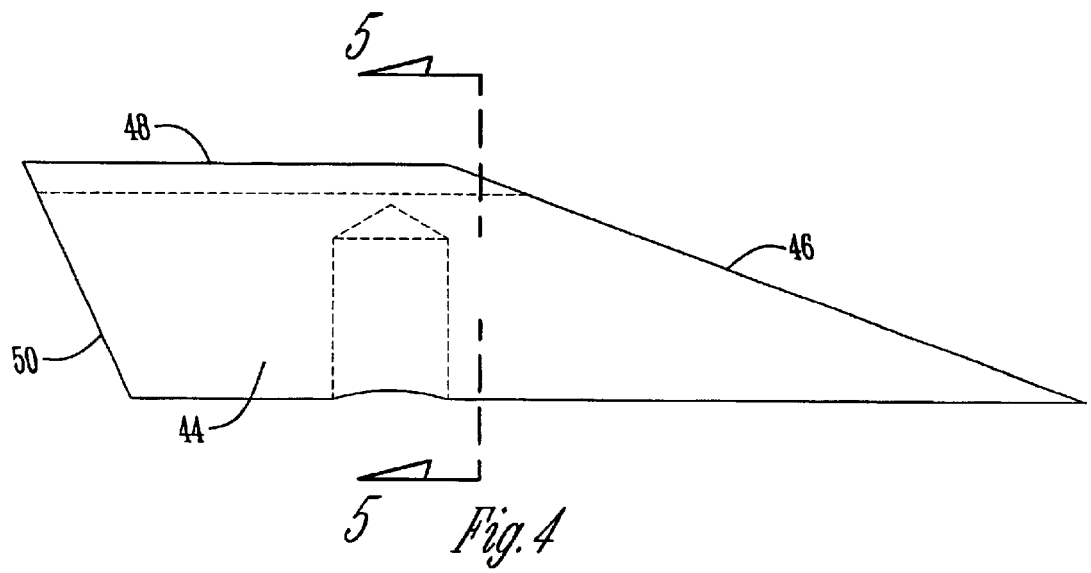
FIG. 4 is a side elevational view at an enlarged scale of the restrictor element located within the stuffing tube.
Figure 5:
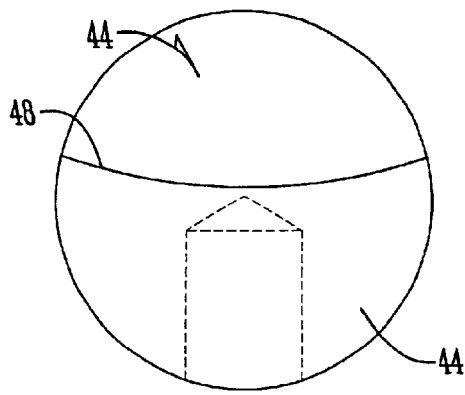
FIG. 5 is an end elevational view of the restrictor element as seen from the left hand end of FIG. 4.
Figure 5A:
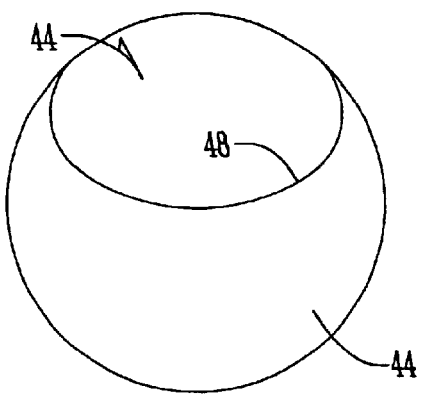
FIG. 5A is an end elevational view of the restrictor element showing an alternate form thereof and being similar to the view shown in FIG. 5.
Figure 6:
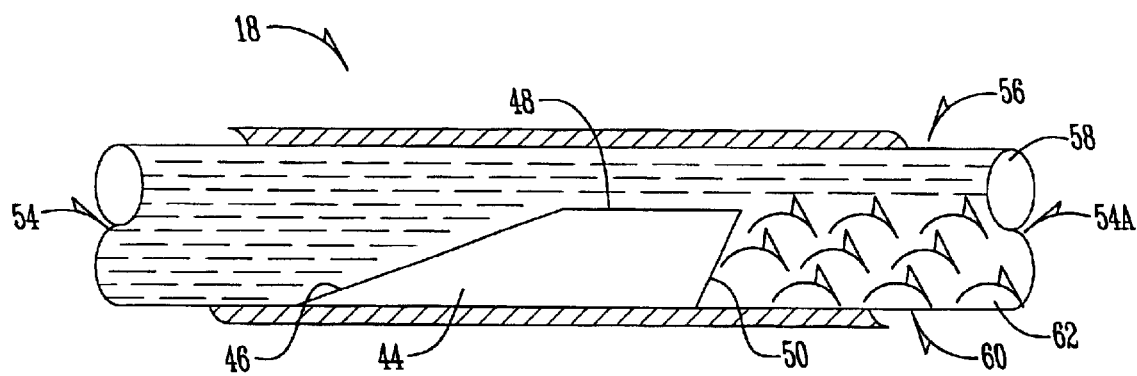
FIG. 6 is a sectional view of the stuffing tube similar to that of FIG. 3 but showing meat emulsion flowing therethrough.
Figure 8:
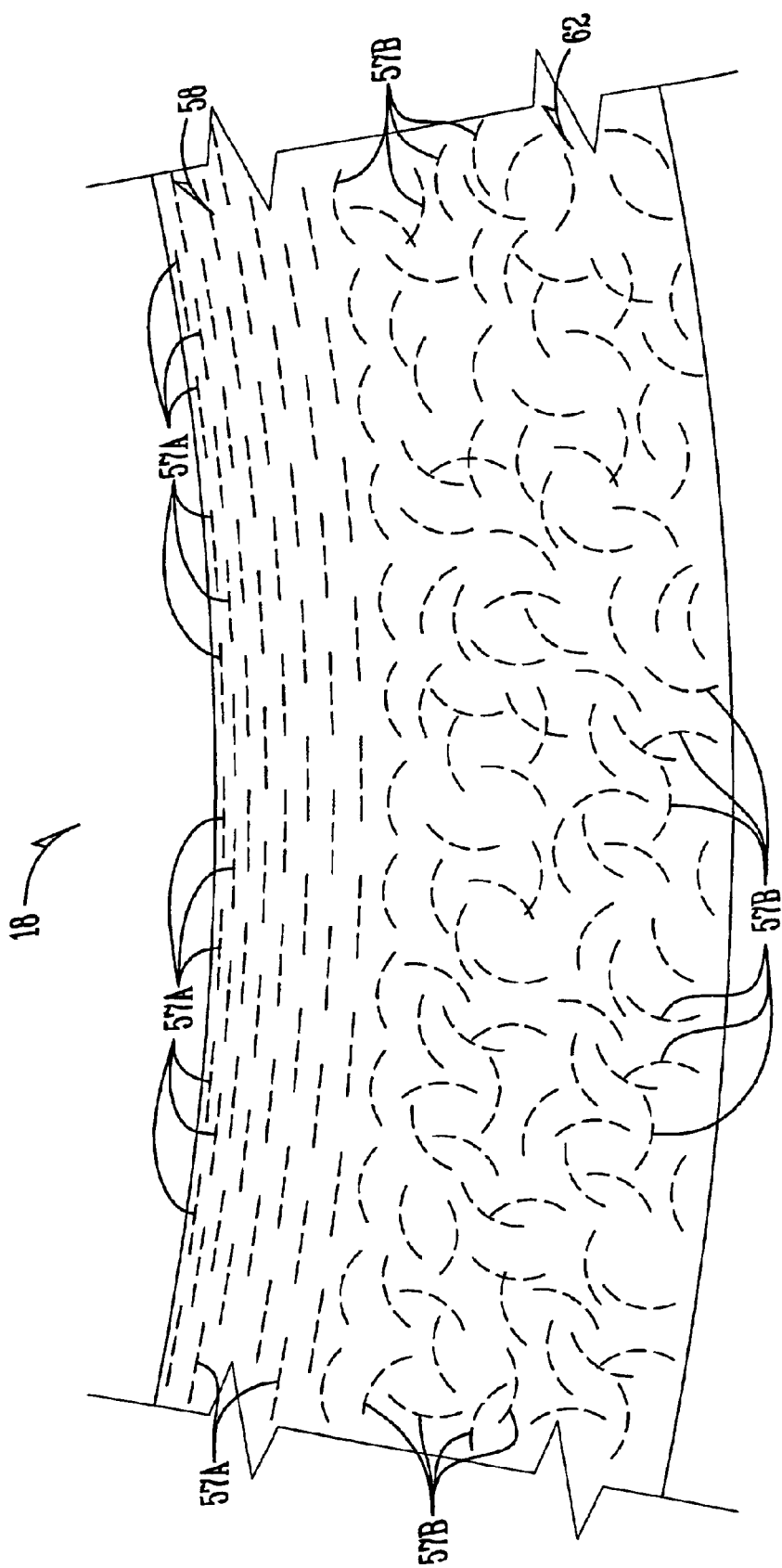
FIG. 8 is a partial sectional view of a heated sausage.

With reference to FIG. 3, the numeral 38 designates the intake end of extrusion tube 18 which receives meat emulsion from the pump 16. Tube 18 has a discharge end 40 which discharges a strand of meat emulsion to the twisting mechanism 20. The tube 18 conventionally has a hollow cylindrical bore 42. A restrictor element 44 (FIG. 3) has a ramp 46 which extends forwardly and upwardly from the bottom of bore 42. The top surface 48 of the restrictor element 48 has an arcuate shape as best shown in FIG. 5 or 5A. The forward end of the resistor element terminates in a diagonal undercut front end 50 which is located approximately 10 mms from the discharge end 40. The restrictor element 44 is secured with tube 18 by set screw 51. A passage 52 is created above the restrictor element. The single sausage strand 54 (FIG. 6) has a portion 56 comprising a gradient portion 58 wherein the protein fibers 57A are in a longitudinal or linear configuration. The portions 56 and 58 are forced longitudinally through the tube 18 in an uninterrupted fashion past and above the restrictor element 48 so that the linear orientation of the protein fibers 57A therein is significantly not interrupted. Again with reference to FIGS. 6 and 8, a lower portion 60 of the sausage strand 54 comprises a lower portion 62 comprised of fibers 57B of random orientation. The lower portion 62 of meat emulsion encounters the ramp 46 of restrictor element 44 and moves upwardly and over the top surface 48 thereof, and thence over the front end thereof to fill the portion of the stuffing tube forwardly of the restrictor element (FIG. 6). Thus, the sausage strand exiting the tube 18 is comprised of an upper portion 58 wherein the protein fibers are linearly disposed, and a lower portion 62 wherein the protein fibers are variably dispersed in a random fashion by the restrictor element 44. In reality, a gradient exists wherein the linearly aligned fibers of the upper portion 58 gradually transitions to the randomly aligned fibers in the "lower" portion 62. Thus, the discharged sausage strand 58A comprised of the two portions 58 and 62 moves into the heating oven 30. The temperature within the heating oven 30 should be in the range of approximately 65°–85° C. In this heated environment, the upper portion 58 shrinks lengthwise at a greater degree than the lower portion 62, and thereupon causes the otherwise straight links 34 to assume the curved condition shown by the links 36 (FIGS. 7 and 8). This method is applicable to sausage strands of different diameters.

It is therefore seen that this invention permits the creation of curved links of sausages without any external forces and with only a single sausage emulsion. It is therefore seen that this invention will achieve at least all of its stated objectives.

What is claimed is:

1. A method of creating curved sausage links, comprising,
   extruding an elongated sausage strand having linear protein fibers therein out of an elongated hollow meat emulsion tube,
   partially restricting the flow of meat emulsion over and past a restriction element in the tube wherein a first portion of meat emulsion including a plurality of linearly and longitudinally extending fibers will move longitudinally over the restriction element to create a first portion of meat emulsion that gradually transitions to a second portion of meat emulsion that engages and passes over the restriction element and including primarily non-linear fibers disposed in a random orientation, and wherein the first portion is more susceptible to lengthwise shrinkage in the presence of heat than the second portion,
   separating the sausage strand upon exiting the tube into a plurality of separate sausage links,
   applying heat to the sausage links wherein the links will assume a curved shape by virtue of he different orientation of fibers in the two portions.

2. The method of claim 1 wherein the heat applied is a bath of hot water.

3. The method of claim 1 wherein the heat applied is a steam cooker with saturated hot air.

4. The method of claim 1 wherein the heat applied is a hot air oven.

5. The method of claim 1 wherein the links are moved over a hot frying surface.

6. The method of claim 1 wherein the heat applied is by applying hot liquid smoke to the links.

7. The method of claim 1 wherein heat applied is a microwave oven.

8. The method of claim 1 wherein heat applied is hot frying oil.

9. The method of claim 1 wherein the applied heat has a temperature of greater than 65° C.

* * * * *